United States Patent Office 2,759,868
Patented Aug. 21, 1956

2,759,868

MANUFACTURE OF POLYMYXINS B AND E

Stanley Robert Morris Bushby, London, England, assignor to Burroughs Wellcome & Co. (U. S. A.) Inc., Tuckahoe, N. Y., a corporation of New York No Drawing. Application June 24, 1952,
Serial No. 295,359

Claims priority, application Great Britain August 5, 1948

6 Claims. (Cl. 167—65)

This invention relates to a novel method for the preparation of purified polymyxin antibiotics and more particularly to the separation of purified polymyxins from mixtures of allied components with which they coexist in the metabolism fluid.

The polymyxins are a family of antibiotics elaborated under suitable metabolic conditions by certain strains of *Bacillus aerosporus* Greer or *Bacillus polymyxa (prazmowski)* Migula. They are basic polypeptides containing a fatty acid residue and several residues of three or four amino acids. The qualitative amino-acid composition of the known polymyxins is shown in the subjoined table:

| Polymyxin | Leucine | Phenyl-alanine | Thre-onine | Serine | $\alpha,\gamma$-diamino-butyric acid | Alkali solubility at pH 8.5 to 10.0 |
|---|---|---|---|---|---|---|
| A | + | − | + | − | + | + |
| B | + | + | + | − | + | − |
| C | − | + | + | − | + | + |
| D | + | − | + | + | + | + |
| E | + | − | + | − | + | − |

As distinguished from other antibiotics the polymyxins are characterized especially by their large content (40% or more) of $\alpha,\gamma$-diamino butyric acid, whose occurrence in nature had not been observed previously.

Preliminary steps in the concentration and purification of polymyxin antibiotics are described in U. S. Patent No. 2,565,057 and in the co-pending application, Serial No. 14,631 of Annie Maude Brown.

While certain strains of B. polymyxa are known to elaborate predominantly one or another of the polymyxins these substances are not the sole antibiotic componants of the metabolism mixtures, and although no strain is known that forms both polymyxins B and E, these antibiotics are commonly accompanied by minor amounts of polymyxins A and C whose removal is of importance since nephrotoxicity is largely associated with them. Often repeated precipitations will afford substantially pure polymyxin B or E but at such a loss of materials as to make such a process prohibitively expensive.

I have discovered, however, that polymyxin B or polymyxin E may be separated from the accompanying nephrotoxic polymyxins by precipitation of the free base from fairly concentrated solutions.

In earlier operations with polymyxins it had been observed that antibiotic activity largely disappeared in alkaline solutions. The entire cause of this phenomenon is not known but it was possible to show when relatively pure polymyxins became available, that inactivation by alkali is less rapid than had been believed. In particular, inactivation is more rapid in dilute than in concentrated solutions of the antibiotic. Thus, operating with polymyxin E preparations having 9500 units/mg. it is found that at 90°, solutions containing 500 units/cc. are half-inactivated in 1 and 35 minutes at pH 12 and 10 respectively. The corresponding times for half-inactivation of solutions containing 10,000 units/cc. are 30 and 75 minutes. To some extent this phenomenon may be related to the fact that in the lower dilutions, the ratio of hydroxyl ions to polymyxin molecules is 20 times as great. Whatever the reason, it is evident that fairly concentrated solutions of polymyxins may be basified for short periods without excessive loss, especially at lower temperatures.

Investigation discloses that polymyxins B and E as bases are relatively insoluble in water, polymyxin E having a solubility of 500 units in 1 cc. at 20° C. The precipitation of polymyxin B or E from a concentrated solution (500,000–750,000 units/cc.=5–7% solutions) thus results in negligible losses of these antibiotics especially since from such solutions the base precipitates rapidly and need not be exposed to the action of alkali for long periods. In carrying out the present invention it is preferred to use polymyxin concentrations of about 500,000 to 1,000,000 units per cc. and basification within the range of from about 8.5 to 11.0, since within these limits precipitation of the desired polymyxins B and E readily occurs and deterioration is minimized. The temperature of the precipitation may vary considerably with different advantages under different conditions. As might be expected, at lower temperatures (0° C.) inactivation is negligible and speed in manipulation is not essential. On the other hand, at higher temperatures (ca. 80° C.) the polymyxin base separates almost instantaneously and in a form easily filtered so that contact with the alkaline solution is very brief. Choice between such conditions may depend on the working schedule and the preferences of the operator. The present application is a continuation-in-part of application Serial No. 108,869 filed on August 5, 1949, now abandoned.

In applying the new method the antibiotic is preferably recovered from the metabolism fluid of a selected strain in accordance with the method described in the companion application Ser. No. 14,631 which involves forming a culture of the bacillus and heating the fluid in the presence of an acid such as hydrochloric acid or sulfuric acid. The mixture is then filtered, treated with activated charcoal to extract impurities therefrom and the pH of the fluid raised above 6.0 whereupon the antibiotic material is adsorbed upon activated charcoal. The antibiotic may then be removed from the activated charcoal under acid conditions by washing with aqueous acetone maintained in an acid pH range by a suitable acid.

The antibiotic recovered in the foregoing manner is converted to a helianthate by adding a saturated solution of methylorange to a solution of salt of the antibiotic in aqueous methanol. The precipitate is converted to the hydrochloride by treatment with the acid in methanol.

It is convenient to employ polymyxin hydrochloride having a biological activity of 6,000–7,000 arbitrary units per milligram as the starting material. An aqueous solution is normally employed, although solutions in organic solvents, such as methanol, can also be used. Any alkali which will give the desired pH may be employed (sodium bicarbonate, for example, is not powerful enough). Ammonia has the advantage that excess is removed on drying and is probably to be preferred but aqueous sodium carbonate (conveniently containing 20% by weight of the anhydrous carbonate) is satisfactory.

The following experimental procedure will now be described by way of example.

*Example 1*

3 grams of polymyxin hydrochloride having a biological activity of 6,000 to 7,000 units per milligram was dissolved in 25 milliliters of water and potassium oxalate was added until no material precipitated. The deposit was removed by centrifuging. Sufficient sodium carbonate (containing 20% of the anhydrous salt by weight) was added slowly with constant stirring to the supernatant fluid to give a finely divided precipitate of the base. This precipitate was collected by suction on a filter paper in a sintered glass funnel or by centrifuging. It was washed with 20% sodium carbonate solution followed by water. Washing was aided by stirring the antibiotic in the washing fluid.

The precipitate can be washed further with organic solvents but this usually causes substantial loss of antibiotic and is not recommended.

The purified precipitate was resuspended in water and converted back from the free base to the hydrochloride by adding 0.1 normal hydrochloric acid until the liquid was acid. If desired the purification can be carried further by reprecipitating the free base by treatment with sodium carbonate until the pH is 8.5 to 9 as before, washing as above described and redissolving the hydrochloric acid.

The purified hydrochloride solution after filtration is dried from the frozen state. The product if desired may be dissolved in methanol and precipitated by pouring into an excess of dry acetone.

*Example 2*

Polymyxin hydrochloride (6,800 u./mg.) was dissolved in water to give a solution of an activity of 750,000 u./cc. The solution was filtered and cooled to 0° C. Concentrated aqueous ammonia solution was added rapidly with stirring: the pH of the mixture was then in the region of 10.5. The precipitated base was filtered, washed with water and air-dried and had a potency of 8,400 u./mg.

*Example 3*

Polymyxin hydrochloride (7,000 u./mg.) was dissolved in water to give a solution of an activity of 750,000 u./cc. The solution was heated to 80° C. and concentrated ammonia was added to give a pH of about 10.5. The precipitate that separated was filtered immediately and washed with water.

A useful alternative to the conversion of the Polymyxin base to the hydrochloride is to dissolve it in methanol and to neutralize with β-naphthalene sulfonic acid. In this fashion the β-naphthalene sulfonate of Polymyxin B or E may be obtained directly in crystalline form and in a high degree of purity. Once crystallized in this way, it can be converted to a crystalline hydrochloride.

The product was of high therapeutic potency and of reduced toxicity and irritant effect relatively to the original mixture of polymyxins.

I claim:

1. A method for the preparation of purified polymyxins which comprises the steps of adjusting the pH of an aqueous solution of polymyxin selected from the class consisting of polymyxin B and polymyxin E having a concentration of about 500,000 to 1,000,000 units per cc. to from about 8.5 to 11.0, allowing the solution to remain within this pH range for a limited time period insufficient to cause substantial destruction of the polymyxin and recovering the precipitated material.

2. The method set forth in claim 1 where the precipitation occurs at temperatures of between about 0° and 80° C.

3. The method set forth in claim 1 wherein the concentration of polymyxin in solution is from about 500,000 to 750,000 units per cc.

4. A method for the preparation of purified polymyxin antibiotics which comprises adjusting the pH of an aqueous solution of polymyxin selected from the class consisting of polymyxin B and polymyxin E having a concentration of at least 10,000 units per cc. to within the range of from about 8.5 to 11.0, allowing the solution to remain within this pH range for a limited time period insufficient to cause substantial destruction of the polymyxin and recovering the purified polymyxin material.

5. The method set forth in claim 4 in which precipitation is carried out at a pH of about 10.0.

6. The method set forth in claim 4 in which the precipitated antibiotic is washed and redissolved in an acid.

References Cited in the file of this patent
UNITED STATES PATENTS 2,565,057    Ainsworth _____ Aug. 21, 1951

OTHER REFERENCES

Shepherd: J. A. C. S., vol. 70, pp. 3771 to 3774 (p. 3773 relied upon), November 1948.